July 23, 1935.  C. SAUZEDDE  2,008,729
MOTOR VEHICLE DIRIGIBLE BRAKING WHEEL
Filed Jan. 4, 1932  3 Sheets-Sheet 3
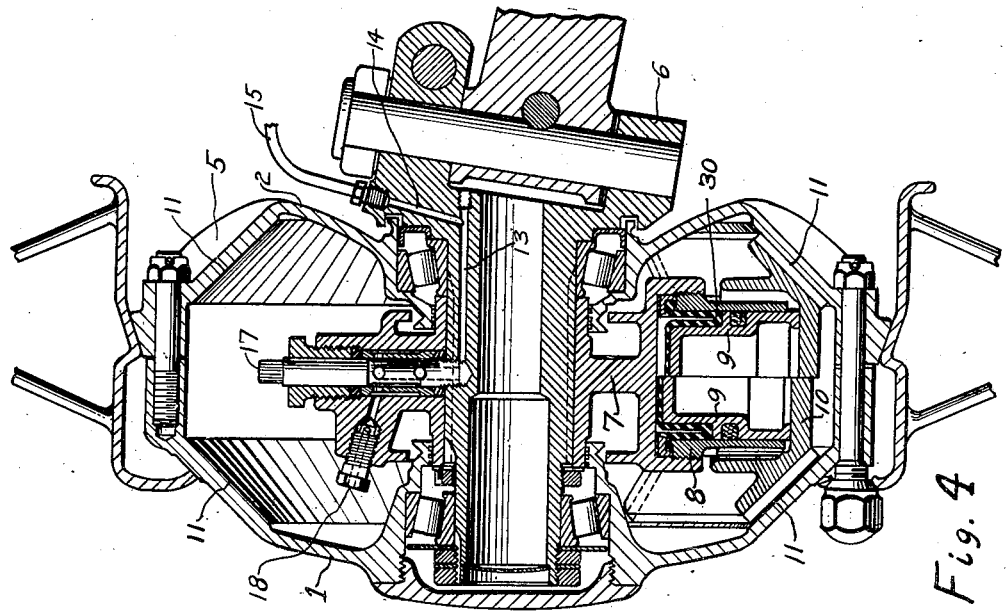
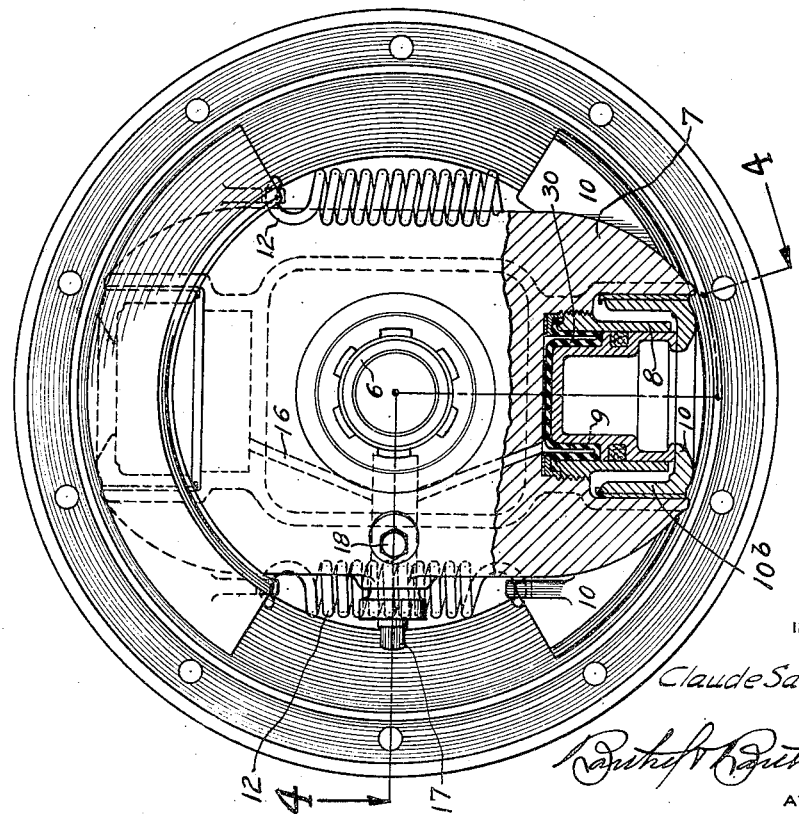
INVENTOR
Claude Sauzedde,
ATTORNEYS Patented July 23, 1935

2,008,729

UNITED STATES PATENT OFFICE 2,008,729

MOTOR VEHICLE DIRIGIBLE BRAKING WHEEL

Claude Sauzedde, Detroit, Mich., assignor to Detroit Hydrostatic Brake Corporation, Detroit, Mich., a corporation of Michigan Application January 4, 1932, Serial No. 584,666

7 Claims. (Cl. 188—152)

The present invention relates to dirigible air-cooled braking wheels particularly adapted for self-propelled road-vehicle use and has for its objective the production of a compact self-contained unit embodying hydrostatically-actuated braking mechanism more than ordinarily well protected from physical injury and from deterioration and wear due to the presence of lubricant, water, dirt, and grit on contacting surfaces by excluding such foreign substances from the sealed chamber within which the fixedly-positioned braking mechanism is mounted on the steering-knuckle spindle of a vehicle front axle.

Figure 1:
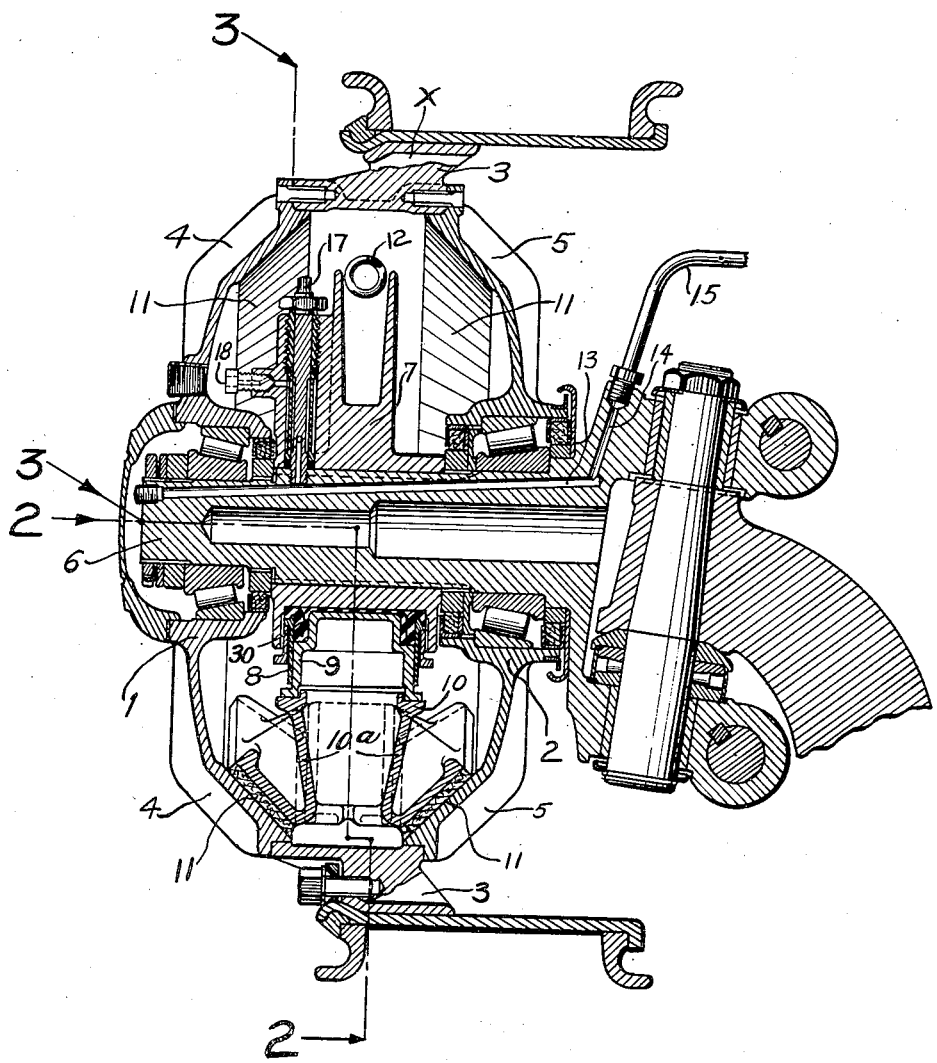
Figure 2:
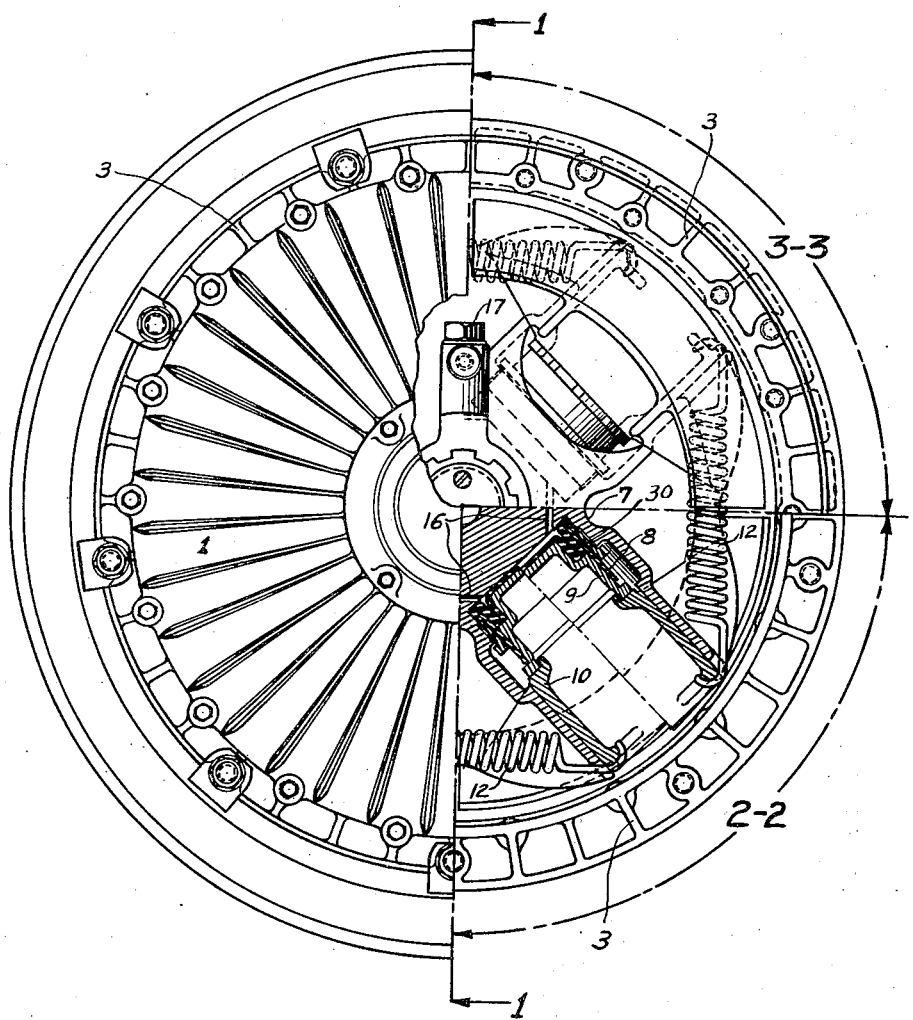

Of the accompanying drawings whereon the same reference figures are applied to like parts, Figure 1 is a transverse sectional view along line 1—1 of Figure 2, showing application of a braking wheel unit to the steering knuckle spindle at one end of a motor-vehicle front axle;

Fig. 2 is a side elevation, looking toward outer side member of wheel hub, combined with quarter sectional views along lines 2—2 and 3—3 of Figure 1;

Fig. 3 is a vertical sectional elevation of a somewhat lighter and smaller dirigible braking-wheel hub structure enclosing braking mechanism having the principal constructional features disclosed by Figure 2 but with a smaller number of sectional-type brake shoes, retracting springs, and fluid-pressure brake-actuating cylinders; and Fig. 4 is a transverse sectional view along line 4—4 of Figure 3 showing front axle steering-knuckle-spindle application of the lighter and smaller dirigible braking wheel hub, to which is demountably applied at periphery a combined wheel felloe and tire-supporting rim having welded-in steel spokes.

The present invention is designed primarily for the application of the fundamentals of the braking system disclosed in my companion application filed March 31, 1930, Serial No. 440,276, to the conditions of service of dirigible wheels. An application of such system to non-dirigible wheels is disclosed in my companion application filed August 20, 1931, Serial No. 558,299, but inasmuch as the conditions are changed when the wheels are made dirigible, certain changes are essential in the application of the braking system, and it is to these that the present invention relates primarily.

The foundation fundamentals of the system referred to is the application of a braking system to that type of wheels in which the tires have the super-oversize characteristic, a wheel type in which the tire is materially "oversize" as compared with the "balloon" type, to an extent, for instance, such as present the tire as forming practically the major portion of the wheel diameter. As a result, the central or metal portion of the wheel—especially where the latter is of the usual diameter for auto or aeroplane wheels—is of relatively small diameter, comparable, somewhat with the diameter of the hub portion of wheels of the latter type. Since this central portion must also carry the axle or stub-shaft on which the wheel is mounted, it can be understood that the allowable space dimensions for the installation of a braking system within such central portion, are limited to a large extent.

To meet this condition, the system itself employs hydrostatic pressure as the actuating means to apply the brakes, the general application of the system contemplating the mounting of an independent brake mechanism within each of the wheels, the application of the pressure being from a central point such as the brake pedal, the system having various mechanisms within the system for the proper maintenance of the desired pressure therein and to deliver such pressure to the individual wheels when the pedal, etc., is actuated to ensure proper delivery of pressure and brake shoe operation within the wheels, in order that the brake operation may be certain in action and efficient in operation. The system thus includes compressor mechanism, pressure-regulating mechanism, fluid replenishing mechanism, etc., these pertaining more particularly to the system as a whole rather than to the wheel structures individually.

Because of the limited dimensions available, the wheel portion of the system has certain characteristics to provide for efficient action and to obtain the necessary power. For instance, the brake pressure required for braking service may reach and exceed 100,000 foot pounds. To obtain such values within the small dimensions available necessitates the application of the brake shoes to the brake surfaces with maximum effect and with certainty. This is obtained by employing dual brake surfaces spaced apart and of equal diameter and cross-sectional characteristics, the latter including the arrangement of a surface inclined to the vertical and horizontal to provide conical surfaces which are located on opposite sides of the wheel interior and face one another. Between the brake surfaces is mounted the brake-applying mechanism, this including a plurality of segmental brake shoes mounted to be moved into engagement with the brake surfaces in a radial direction with respect to the axis of the wheel, the shoes having faces complemental to the brake surfaces.

To provide this radial movement, each pair of brake-shoes—one for each brake surface—is mounted relative to a radially-moving piston which is mounted within a cylinder and subject to the hydrostatic pressure. The return of the braking shoes to inactive positions is provided by suitable spring structures properly mounted to normally tend to return the shoes to such positions, whenever the system operation permits the pistons to be moved toward the wheel axis. The number of pistons utilized may be varied for different services, but in each instance, the pistons of a wheel are interconnected operatively through the fluid passageways, as to cause the pistons to have similar movements concurrently. As a result, the brake shoes are applied with great power and rapidly, and the dual application provides sufficient frictional development to provide the essential brake pounds pressure. Since the direction of movement of the brakeshoes is radial, the length of piston movement may be kept small, since the shoes quickly pass out of contact with the surfaces, and thus require but short strokes of the pistons.

From the above it can be understood that, primarily, the problems are due to the limitation—diametrically of the wheel—of the space available for the location of brake mechanism within the wheel. It is essential that the mechanism be wholly enclosed to prevent dust, etc., entering and affecting operation, and the wheels thus have inner and outer side members which carry the respective brake surfaces, a spider, carried by the axle, forming the support for the cylinders and pistons, with these located between the brake surfaces, the latter, however, being located radially outside of the cylinders, pistons and brake shoes, in order that a maximum surface area can be obtained for co-operation with the shoes.

While this limitation is present, it does not form the only problem, since it is evident that the actual brake mechanism structure employed must be capable of withstanding the strains, etc., incident to a service of this type. Part of this latter condition might be met by increasing part dimensions laterally and thus obtain the strength characteristic necessary, where the structure is to be employed where the width dimension of the wheel is unimportant. But where such width dimension is limited, there is more or less of an additional problem present, since the space limitations then reach to both radial and axial directions, and it is necessary to provide element structure and arrangement to produce the desired result within the smaller space.

As heretofore pointed out, the companion application, Serial No. 558,299, presents an application of the system under conditions where the axle or stub-shaft is non-dirigible, the specific application being that of an aircraft wheel, a service where the load is heavy and the brake-power required is maximum. In such application, the width dimension of the wheel body is not subject to the space limitation condition, and provision can be readily made for the application of the system.

However, where the system is to be applied to auto and motor truck service, the conditions are changed somewhat in this respect, and especially where the application is to be made to dirigible wheels. In the latter type, the necessity for use of a steering knuckle, etc., decreases the length of the axle or stub-shaft which carries the wheel, and hence the space limitation axially of the wheel adds to the problem of system application.

Referring first to Figs. 1 and 2 of the drawings, 1 and 2 designate respectively the inner and outer members of the wheel and which can be referred to as brake drums since each carries as a part thereof, the faces 11 which form the annular braking surfaces, inclined as previously pointed out. These members are mounted on suitable anti-friction bearing structures carried by the stub-shaft or axle 6 which is carried by the usual axle, with the connection having the usual steering-knuckle arrangement, this portion of the disclosure being simply illustrative and requiring no description, the stub-axle 6 being specifically included, since it forms the actual support for the wheel parts.

The members 1 and 2 are spaced peripherally by an annular member 3, which closes peripherally the space within which the mechanism is located. Member 3, and the side members are connected in suitable manner, and member 3 serves as a seat on which the tire is secured. Because of the frictional heat possibilities, the member 3 is provided with lateral openings x for heat dissipation, the arrangement of these and the operation not being particularly enlarged upon here, since this phase forms the subject matter of my companion application filed November 18, 1931, Serial No. 575,841.

However, it is desirable to aid specifically the heat dissipation under the conditions of the present invention, and for this purpose the side members or drums are provided with radially extending fins projecting outwardly from the outer face of the member. With wheels for light duty service where the brake pressure required is not so large, the fin application may be on but one of the brake drums; where heavy duty service is present, however, I prefer to equip both drums in this way, these fins being indicated as 4 and 5.

7 indicates the spider which, in this particular form is designed to support four cylinders 8, the spider being suitably secured to the shaft or axle 6, the mounting being such as to prevent relative rotative movement therebetween. 9 indicates the piston mounted within each cylinder, a seal 30 being mounted between the piston and the spider within the cylinder; the seal is preferably of the type disclosed in my companion application filed September 4, 1931, Serial No. 561,209, and serves to prevent leakage of the hydrostatic fluid employed.

The spider is generally of the type disclosed in my companion application filed October 8, 1931, Serial No. 567,672, in which the radiating portions have their outer zones in the form of guides within which the inwardly extending portion of a brake shoe element 10 extends and is movable, the inner edge of such portion resting upon the outer end of the piston. The brake shoe element is formed with the laterally projecting segmental shoes having faces complementary to the brake surfaces 11. When the piston is moved outwardly in a radial direction, the shoe formation 10 is moved outwardly radially, thus bringing both brake shoe faces into contact concurrently with the brake surfaces 11, thus setting the brakes.

The shaft 6 is provided with a channel 13 extending generally in the direction of length of the shaft, said channel having laterally-extending portion 14 leading through a portion of the knuckle, the channel being operatively connected with the supply lines of the system through a connection 15, which, because of the dirigibility of the wheel is suitably arranged to permit of the proper swivelling action of the shaft or spindle 6.

As indicated in Fig. 2, the spider is formed with a series of channels 7a which connect the several cylinders into a communicating series, and provision is made to connect up these channels 7a with channel 13, thus providing for the movement of the fluid from the system into and out of the cylinders beneath the seal 30.

Since the brake shoe segments are located at opposite sides of the wheel, and are bridged by the inwardly extending portions 10a which move in the guides of the spider, the bridging elements can serve as supports for springs 12 which connect a bridge of one shoe to an adjacent bridge of the succeeding shoe structure, thus providing an arrangement by which the spring tension increased during the outward movement of the shoes in setting the brakes, will return the shoes inwardly when the system operation relieves the channels to permit the fluid of the cylinders to return to the system by release movement of the pedal.

The above generally indicates the fundamental characteristics of the brake mechanism of the system referred to, as applied to the present specific service, the drawings illustrating other structures for completing the wheel and rendering the interior dust-proof, but these are not specifically referred to, the arrangement, however, carrying the control mechanism 17, 18, forming the subject-matter of a companion application filed October 8, 1931, Serial No. 567,671.

While these elements are disclosed broadly in the application Serial No. 558,299, the arrangement and formation of parts is changed herein due to the reduction in width dimension available for the installation of the mechanism. Amongst these changes are the following:

Due to the decrease in width, it is essential that the spacing of the brake surfaces 11 be decreased, together with a decrease in the axial length of the spider. Since the size of the shoe and brake surfaces are to remain constant, this change in dimensions provides a condition such that the spacing of the brake surfaces becomes approximately equal to the diameter of the piston with the result that the arrangement for the support of the shoes by the piston is changed, Fig. 1 indicating that the piston length is materially shortened and the bridging members 10a lengthened and extending inwardly in diverging directions, thus providing the positive strength for the brake application under conditions where the spacing appeared to present the usual method—the latter being shown more particularly in Figs. 3 and 4, in which the bridging members 10b are direct connections and rest upon the outer end of the piston. By this change, the reduction in width can be provided without materially affecting the piston diameter and therefore the power of the system.

As shown in Fig. 1, the arrangement is such as to permit the tire to be properly positioned so that a vertical plane through the center of the tread will be properly located relative to a line corresponding to the axis of the knuckle, to provide for efficient steering. To permit this, the annular member 3 is arranged for the desired seating of the tire rim, the details of this being omitted in the above description, although shown in the drawings, in which the member 3 is arranged to receive the rim demountably with the rim then held by suitable bolts as shown at the bottom of Fig. 1. An arrangement of this type wherein the rim extends inwardly beyond the member 3, since the overall wheel diameter is such that the rim must be supported in this general fashion to provide the steering action. This condition is one of the reasons necessitating the decrease in width of the metal portion of the wheel referred to in order to reduce as far as possible the projection of the metal portion from such tread line.

The changed characteristics are somewhat varied from the above where the wheel is to have a demountable section differing from the simple rim type. As shown in Fig. 4, the demountable section includes a wire-spoke section inside of the tire. This not only decreases the dimensions diametrically of the brake mechanism "hub" because of the interpositioning of the spoke section, but also reduces the width dimension. This is due to the fact that provision must be made to support a median portion of the demountable section, and provision for this must be provided by the "hub" structure while maintaining the proper relation of tread line and steering knuckle axis to permit proper steering. As a result, the overall dimensions of the hub or central section of the wheel are reduced radially and laterally, thus making the structure relatively smaller than the form shown in Fig. 1.

To meet this condition, the number of pistons is reduced to two, with the spider correspondingly changed. The annular member 3 is omitted and the side members 1 and 2 are flanged inwardly as at 1a and 2a to provide the spacing of the surfaces 11, the opposing flanges being in abutting relation and secured together by suitable means such as bolts. The radial length of the structure being decreased, the piston length brings it into contact with the bridge which connects the shoes, thus omitting the inwardly extending portions 10a of Fig. 1, the latter being substituted by depending portions 10b which cooperate with slides of the spider as indicated in Fig. 3. In addition, the connection of springs 12 is shifted from the bridge portion to the shoes, the latter being provided with ears for the attachment of the springs.

Due to the decrease in width dimension other changes are essential. For instance, the inner side member 2 is depressed inwardly—considered with respect to the outer face of the member—as at 2b, thus shifting the position of the roller bearing which supports this side member. In addition, channel 13 is shortened to provide the delivery of the fluid central of the spider instead of at one side, with the structure 17, 18 shifted accordingly. By these changes, the spacing of the faces 11 is not reduced and the power factor of the brake mechanism is approximately maintained, since the piston dimensions are not materially changed.

From the above it can be understood that the problems set up by the dirigibility conditions are such as to necessitate special structures to enable the braking efficiency to be maintained. The necessity for providing the proper relation of the tread plane with the knuckle axis—a condition not present with respect to non-dirigible wheels—compels a decrease in the width dimension of the "hub" in order to permit proper location of the hub relative to the demountable portion of the wheel. To obtain the brake power, the brake surfaces, brake shoes and their operating mechanism it is essential that these elements retain generally the dimensions of the general system, and this result is obtained in the manner indicated although the width dimension permissible has been materially reduced.

Having disclosed my invention in a manner to permit others to understand and make use of it, I claim:

1. A combined wheel and brake assembly for dirigible wheel service, wherein the wheel tire is of the super-oversize type, said assembly comprising a stub axle mounted for steering dirigibility, a tire-receiving hub mounted thereon, and fluid pressure brake mechanism within the hub and operatively connected to a source of fluid pressure supply through the axle, said hub providing a closed casing for the mechanism and including oppositely-disposed side members rotatably supported on the axle and each carrying a conical brake surface, said members being secured in relative positions to locate said surfaces in opposed spaced-apart relation, said brake mechanism being carried by the axle and including brake-shoe elements movable into and out of co-operative relation with the opposed conical braking surfaces by radial movement of the elements, the width dimension of the assembly being such that the tread line of the applied tire and the line of the steering axis are properly located relatively for efficient steering action.

2. An assembly as in claim 1 characterized in that the brake-shoe elements are operatively connected by springs arranged to provide pressure opposing the brake-applying movements of the elements, and the brake mechanism includes a piston for each shoe element, the piston being movable radially outward to set the element by fluid pressure activity applied to the piston and in the opposite direction by spring pressure applied to the elements.

3. An assembly as in claim 1 characterized in that the brake-shoe elements are operatively connected by springs arranged to provide pressure opposing the brake-applying movements of the elements, and the brake mechanism includes a piston for each shoe element, the piston being movable radially outward to set the element by fluid pressure activity applied to the piston and in the opposite direction by spring pressure applied to the elements, the piston axes lying outside of the tread line of the wheel.

4. An assembly as in claim 1 characterized in that the brake-shoe elements are operatively connected by springs arranged to provide pressure opposing the brake-applying movements of the elements, and the brake mechanism includes a piston for each shoe element, the piston being movable radially outward to set the element by fluid pressure activity applied to the piston and in the opposite direction by spring pressure applied to the elements, the spacing of the brake surfaces being approximately equal to the maximum diameter of the piston, with the brake shoe element having a bridging structure held in contact with the outer end of the piston by the spring pressure.

5. An assembly as in claim 1 characterized in that the brake-shoe elements are operatively connected by springs arranged to provide pressure opposing the brake-applying movements of the elements, and the brake mechanism includes a piston for each shoe element, the piston being movable radially outward to set the element by fluid pressure activity applied to the piston and in the opposite direction by spring pressure activity applied to the elements, the spacing of the brake surfaces being approximately equal to the maximum diameter of the piston with the brake shoe element having a bridging structure including a formation extending inward radially of the wheel and held in contact with the outer end of the piston by the spring pressure.

6. An assembly as in claim 1 characterized in that the brake-shoe elements are operatively connected by springs arranged to provide pressure opposing the brake-applying movements of the elements, and the brake mechanism includes a piston for each shoe element, the piston being movable radially outward to set the element by fluid pressure activity applied to the piston and in the opposite direction by spring pressure activity applied to the elements, the spacing of the brake surfaces being approximately equal to the maximum diameter of the piston with the brake shoe element having a bridging structure including a formation extending radially of the wheel and diverging inwardly relatively to the piston axis and held in contact with the outer end of the piston by spring pressure.

7. An assembly as in claim 1, characterized in that the inner side member is depressed inwardly intermediate the brake surface and the supporting zone of the member.

CLAUDE SAUZEDDE.